United States Patent
Scholefield et al.

(10) Patent No.: US 9,841,045 B2
(45) Date of Patent: Dec. 12, 2017

(54) BLIND RIVET FASTENER

(71) Applicant: GESIPA BLINDNIETTECHNIK GMBH, Moerfelden-Walldorf (DE)

(72) Inventors: Diana Scholefield, Denholme (GB); Richard Gaertner, Griesheim (DE); Stuart Booth, Keighley (GB)

(73) Assignee: GESIPA BLINDNIETTECHNIK GMBH, Moerfelden-Walldorf (DE)

( * ) Notice: Subject to any disclaimer, the term of this patent is extended or adjusted under 35 U.S.C. 154(b) by 183 days.

(21) Appl. No.: 14/621,977

(22) Filed: Feb. 13, 2015

(65) Prior Publication Data
US 2015/0240854 A1 Aug. 27, 2015

(30) Foreign Application Priority Data
Feb. 24, 2014 (EP) .................... 14156287

(51) Int. Cl.
*F16B 37/06* (2006.01)
*F16B 5/02* (2006.01)
*F16B 19/10* (2006.01)

(52) U.S. Cl.
CPC .......... *F16B 37/065* (2013.01); *F16B 5/0275* (2013.01); *F16B 19/1072* (2013.01); *F16B 19/1045* (2013.01)

(58) Field of Classification Search
CPC .... F16B 37/062; F16B 37/065; F16B 37/067; F16B 19/1045; F16B 5/0275
USPC ................... 411/34, 107, 183, 389
See application file for complete search history.

(56) References Cited

U.S. PATENT DOCUMENTS

| | | | |
|---|---|---|---|
| 3,124,189 A * | 3/1964 | Dietlein | F16B 39/10 411/107 |
| 3,858,479 A | 1/1975 | Sekhon | |
| 4,036,098 A * | 7/1977 | Schruff | F16B 19/1054 411/34 |
| 5,219,252 A * | 6/1993 | Schruff | F16B 37/067 411/107 |
| 6,186,717 B1 * | 2/2001 | Cosenza | F16B 29/00 411/34 |
| 6,551,040 B1 | 4/2003 | Terry et al. | |
| 6,592,311 B2 * | 7/2003 | Wojciechowski | B23P 19/062 411/107 |
| 7,156,596 B2 * | 1/2007 | Makino | F16B 19/1054 411/107 |
| 7,568,871 B2 * | 8/2009 | Chopp, Jr. | F16B 5/0275 411/107 |
| 8,444,356 B2 * | 5/2013 | Crutchley | F16B 35/048 411/103 |
| 2013/0061451 A1 | 3/2013 | Pratt | |

OTHER PUBLICATIONS

European Search Report conducted in counterpart European Appln. No. 141 56 287.6-1758 (dated Jul. 3, 2014).

* cited by examiner

*Primary Examiner* — Flemming Saether
(74) *Attorney, Agent, or Firm* — Greenblum & Bernstein, P.L.C.

(57) ABSTRACT

Blind rivet fastener and method of forming blind rivet fastener. The blind rivet fastener includes a blind rivet sleeve having a set head end with a set head and a shank end, and a stud structured and arranged so that a receiving section projects from the set head end and so that an attachment section projects from the shank end.

2 Claims, 1 Drawing Sheet

BLIND RIVET FASTENER

CROSS-REFERENCE TO RELATED APPLICATIONS

The present application claims priority under 35 U.S.C. §119 of European Patent Application No. 14 156 287.6 filed Feb. 24, 2014, the disclosure of which is expressly incorporated by reference herein in its entirety.

BACKGROUND OF THE EMBODIMENTS

1. Field of the Invention

Embodiments of the invention relate to a blind rivet fastener with a blind rivet sleeve that includes a set head end having a set head and a shank end, and with a stud that, at the set head end, projects out of the blind rivet sleeve with a receiving section.

2. Discussion of Background Information

A blind rivet fastener of this type is, when the stud is provided with a thread on the receiving section, also referred to as a "blind rivet stud nut" and is available under the trade name BNS from GESIPA-Blindniettechnik GmbH, Mörfelden-Walldorf, Federal Republic of Germany.

A blind rivet fastener of this type is used to create a fastening option on components, walls, plates or the like, which would not be suitable, for example, for the welding-on of a threaded stud or the screwing-in of a screw. The blind rivet fastener is then guided with its blind rivet sleeve through a corresponding opening in the wall or plate until the set head bears against the component, wall or plate. Via a pull on the stud, the shank of the blind rivet sleeve is deformed such that a closing head forms on the side of the wall facing away from the set head. The blind rivet sleeve is thus fastened in the wall. The receiving section of the stud is available for fastening purposes.

SUMMARY OF THE EMBODIMENTS

Accordingly, embodiments of the invention are directed to expanding fastening options of the blind rivet fastener.

In this regard, a blind rivet fastener of the type described above includes, at the shank end, a stud projecting out of the blind rivet sleeve with an attachment section.

Once the blind rivet fastener has been set in the wall, two fastening options are thus available, i.e., on both sides of the wall. On the one side of the wall, the receiving section can be used to fasten objects in this location. On the other side of the wall, the attachment section is likewise available for the fastening of objects. The terms "receiving section" and "attachment section" were selected to allow a differentiation between these two sections. Theoretically, they can be embodied or formed identically. However, they can also be embodied or formed differently.

Preferably, the receiving section includes a receiving/fastening geometry and/or the attachment section comprises an attachment/fastening geometry. With a fastening geometry of this type, the attachment of objects or devices to the respective sections is facilitated.

Preferably, both the receiving section and also the attachment section respectively includes a fastening geometry, and the receiving/fastening geometry and the attachment/fastening geometry are embodied or formed differently. It is also possible to adapt the two fastening geometries to the respectively desired tasks so that high flexibility in the use of the blind rivet fastener is attained.

Preferably, at least one of the fastening geometries is embodied or formed as a thread. If a thread is present, the object that is to be fastened can be threaded onto the thread and then fastened using a threaded nut that is screwed onto the thread.

Preferably, both fastening geometries are embodied or formed as a thread and one of the fastening geometries includes a different thread pitch than the other fastening geometry. Thus, one thread can be embodied or formed as a coarse thread and one thread can be embodied or formed as a normal thread or fine thread, for example. It is also possible to embody one thread as a metric thread and the other thread as an inch thread.

Preferably, the stud and the blind rivet sleeve are connected to one another by a thread pairing. This means that the stud comprises, at least in the region of the blind rivet sleeve, an external thread, into which an internal thread of the blind rivet sleeve engages. In the production of the blind rivet fastener, this internal thread can, for example, also be formed in that the blind rivet sleeve is pressed with its inside onto the external thread.

Here, it is preferred that the stud comprises in the region of the thread pairing an external thread which continues in a fastening geometry.

One of the two threads can additionally be used to connect the blind rivet sleeve and the stud to one another.

In an alternative embodiment, it is provided that at least one fastening geometry is embodied or formed as a groove arrangement. The groove arrangement can comprise one or multiple circumferential grooves or channels, in which a fastening device of an object can engage.

In an alternative embodiment, it can be provided that at least one fastening geometry is embodied or formed as a projection arrangement. This projection arrangement can, e.g., comprise a bevel in order to facilitate a sliding-on of a fastening device of an object and a subsequent engagement.

Preferably, the stud is fastened non-rotatably in the blind rivet sleeve. In particular, this is advantageous where one fastening geometry or both fastening geometries are embodied or formed as a thread. In this case, a threaded nut can be screwed onto the thread more easily, since there is virtually no risk of the stud rotating along with the nut.

Preferably, the receiving section has a different diameter than the attachment section. In this manner, it is also possible to adapt the two sections to different fastening options.

Preferably, the stud has a diameter enlargement which bears against a step of the blind rivet sleeve. It can, e.g., be provided that the stud bears with the diameter enlargement against the step of the blind rivet sleeve with a certain prestress. This prestress impedes, e.g., the unscrewing of the stud from the blind rivet sleeve.

In an alternative or additional embodiment, it can be provided that the stud has a diameter enlargement which bears against the shank end. In this case, the diameter enlargement of the stud can also be used to transfer to the blind rivet sleeve the forces necessary to form the closing head.

Finally, in an additional or alternative embodiment, it is also possible that the attachment section is provided with a flange which bears against the shank end. In this case, the diameter of the attachment section can indeed be smaller than the diameter of the receiving section.

Embodiments of the invention are directed to a blind rivet fastener that includes a blind rivet sleeve having a set head end with a set head and a shank end, and a stud structured and arranged so that a receiving section projects from the set head end and so that an attachment section projects from the shank end.

According to embodiments, the receiving section can include at least one of a receiving/fastening geometry and the attachment section can include an attachment/fastening geometry. Both the receiving section and also the attachment section may include a same fastening geometry. The receiving/fastening geometry and the attachment/fastening geometry may be embodied differently. Further, at least one of the fastening geometries can be embodied as a thread. Both fastening geometries can be embodied as a thread and one of the fastening geometries has a thread pitch different than a thread pitch of the other fastening geometry.

In accordance with other embodiments of the invention, the stud and the blind rivet sleeve can be connected to one another by a thread pairing. The stud may include, in a region of the thread pairing, an external thread which continues in a fastening geometry. At least one of the fastening geometries can be embodied as a groove arrangement. Further, at least one of the fastening geometries may be embodied as a projection arrangement.

In still other embodiments, the stud may be non-rotatably fastened in the blind rivet sleeve.

In further embodiments, the receiving section may have a diameter different than a diameter of the attachment section.

Moreover, the blind rivet sleeve may include a step, and the stud can have a diameter enlargement structured and arranged to bear against the step.

In accordance with other embodiments, the stud can have a diameter enlargement structured and arranged to bear against the shank end.

In further embodiments, the attachment section can include a flange that is structured and arranged to bear against the shank end.

Embodiments of the invention are directed to a method of forming a blind rivet fastener having a blind rivet sleeve with a shank, a set head end and a shank end. The method includes pressing a fastening section of the shank onto threads of a stud so that a receiving section of the stud projects from the set head end and an attachment section of the stud projects from the shank end. The fastening section includes threads that pair with the threads of the stud.

According to embodiments, the method can also include attaching a welding point in the fastening section to non-rotatably attach the blind rivet sleeve and the stud.

In accordance with still yet other embodiments of the present invention, an external thread can be formed on the receiving section and on the attachment section. The external thread on the receiving section and on the attachment section may be continuous. Further, the external thread on the receiving section and on the attachment section can be different.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied or formed in practice.

Figure 1:
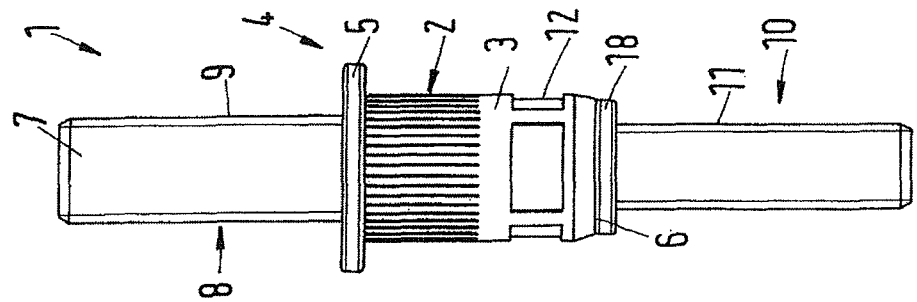
FIG. 1 shows a first embodiment of a blind rivet fastener.

FIG. 1 shows a blind rivet fastener 1 with a blind rivet sleeve 2 which comprises a shank 3, a set head end 4 having a set head 5, and a shank end 6.

Furthermore, the blind rivet fastener 1 comprises a stud 7 that, at the set head end 4, projects out of the blind rivet sleeve 2 with a receiving section 8. The receiving section 8 is provided with an external thread 9.

At the shank end 6, the stud 7 projects out of the blind rivet sleeve 2 with an attachment section 10. The attachment section 10 comprises an external thread 11.

In the present exemplary embodiment, the stud 7 has a continuous thread which forms both the external thread 9 on the receiving section 8 and also the external thread 11 on the attachment section 10. The shank 3 of the blind rivet sleeve 2 is pressed onto this thread 9, 11 in a fastening section 12 so that the stud 7 and the blind rivet sleeve 2 are connected to one another by a thread pairing. Thus, the stud 7 could theoretically be screwed out of the blind rivet sleeve 2. To prevent this, a welding point 13 can, for example, be provided in the fastening section 12 so that the stud 7 and the blind rivet sleeve 2 are non-rotatably connected to one another. In place of a welding point 13, it can also be provided that the blind rivet sleeve 2 is clamped to the stud 7, so that a rotation between the stud 7 and the blind rivet sleeve 2 is also not possible in this case.

The external thread 9 forms a receiving/fastening geometry. The external thread 11 on the attachment section 10 forms an attachment/fastening geometry. The two external threads 9, 11 can, as indicated above, be embodied or formed identically. However, they can also be embodied or formed differently. For example, one of the two external threads 9, 11 can be embodied or formed as a metric thread and the other external thread 11, 9 can be embodied or formed as an inch thread. It is also possible to embody one of the two external threads 9, 11 as a course thread and the other external thread 11, 9 as a normal thread or as a fine thread, or threads with different pitches can be used in another manner.

In place of external threads, other fastening geometries can of course be used, for example, a groove arrangement having one or multiple grooves or a projection arrangement having one or multiple projections. The specific type of the embodiment of the fastening geometries depends on the desired purpose of use. In any case, it is expedient if a setting tool can also act on the fastening geometry of the receiving section 8, i.e., in such a manner that the tool can exert a pull on the stud 7 sufficient to form a closing head.

The shank 3 of the blind rivet sleeve 2 can, as illustrated, be knurled. However, it is also possible to embody the shank 3 with a partial hexagon or a full hexagon or another polygonal shape. It is also possible to embody the shank 3 in a round or cylindrical manner. This is particularly advantageous if the fastening geometry is only loaded by tension or pressure and if no rotation is necessary to fasten objects, against which rotation the stud would need to be secured. With a round shank shape, the cost to produce the receiving opening for the blind rivet fastener 1 is relatively low.

The closing head 5 can be embodied or formed as a flat head, as a small head or as a countersunk head. Of course, other forms are also possible.

In the embodiment in FIG. 1, the receiving section 8 and the attachment section 10 have the same outer diameter.

Figure 2:
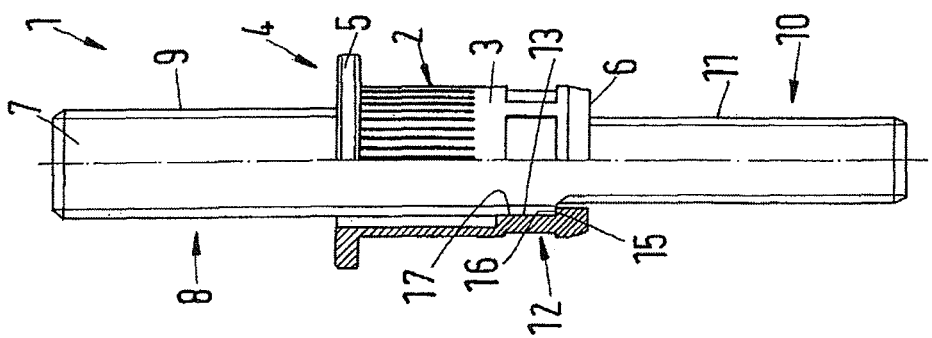
FIG. 2 shows a second embodiment of a blind rivet fastener.

In FIG. 2, a second embodiment of a blind rivet fastener is illustrated in which identical elements are provided with the same reference numerals.

In this case, the attachment section 10 has a larger diameter than the receiving section 8. Accordingly, the stud 7 comprises a diameter enlargement 14 which bears against the shank end 6 of the shank 3 of the blind rivet sleeve 2. In this case, the diameter enlargement 14 can be used to apply a corresponding pressure to the shank end 6 when a tensile force directed out of the blind rivet sleeve 2 is applied to the stud 7, which pressure ultimately leads to a deformation of the shank 3 of the blind rivet sleeve 2 and to the formation of a closing head.

Figure 3:
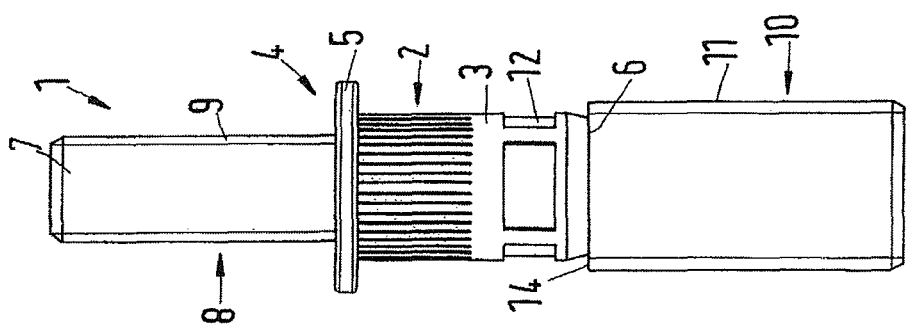
FIG. 3 shows a third embodiment of a blind rivet fastener, partially in section.

FIG. 3 shows a third embodiment of a blind rivet fastener 1, in which identical elements have been provided with the same reference numerals.

Here, the attachment section 10 has a smaller diameter than the receiving section 8. Accordingly, the stud 7 has a diameter enlargement 15 which bears against a step 16 in the blind rivet sleeve 2. The step 16 is located at the end of the internal thread 17 that is embodied or formed in the fastening section 12 of the blind rivet sleeve 2. If the stud has been screwed into the blind rivet sleeve 2 with a higher torque, then a certain prestress results between the diameter enlargement 15 and the step 16, which in many cases is sufficient to achieve rotation prevention. Despite this, a welding point 13 can be provided in order to ensure rotation prevention.

Figure 4:
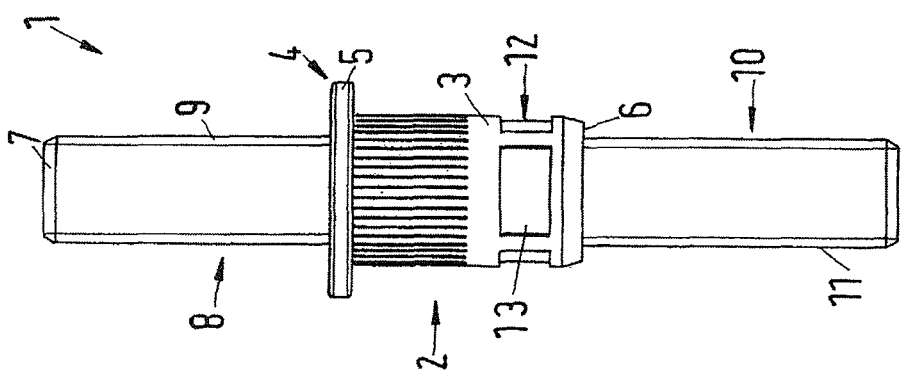
FIG. 4 shows a fourth embodiment of a blind rivet fastener.

FIG. 4 shows a fourth embodiment of a blind rivet fastener 1, in which identical elements have been provided with the same reference numerals. In this case, the outer diameter of the attachment section 10 is also smaller than the outer diameter of the receiving section 8. On the attachment section 10, a flange 18 is arranged which bears against the shank end 6. This flange 18 can be used to transfer sufficient deformation forces from the stud 7 to the shank 3 of the blind rivet sleeve 2.

If the fastening geometry of the attachment section 10 is, as illustrated, embodied or formed as an external thread 11, then a rotation prevention can also be achieved in that the ring 18 is screwed against the shank 3 of the blind rivet sleeve 2 with a sufficiently large torque, so that the ring forms a "counter nut" as it were. In this case, the welding point 13 would, as illustrated, not be necessary.

Of course, in all embodiments, other options for rotation prevention can also be used in place of a welding point 13, for example, an adhesive or a targeted thread deformation.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A blind rivet fastener comprising:
   a blind rivet sleeve having a set head end with a set head and a shank end; and
   a stud being structured and arranged so that a receiving section projects from the set head end and so that an attachment section projects from the shank end,
   wherein the stud is non-rotatably fastened in the blind rivet sleeve,
   wherein the receiving section comprises at least one of a receiving/fastening geometry and the attachment section comprises an attachment/fastening geometry, and
   wherein both the receiving section and also the attachment section comprise a same fastening geometry.

2. A blind rivet fastener comprising:
   a blind rivet sleeve comprising:
      a deformable shank section; and
      a fastening section;
   a stud comprising:
      a section disposed inside the blind rivet sleeve;
      a receiving section that projects from one end of the blind rivet sleeve and comprises an external fastening geometry; and
      an attachment section that projects from an opposite end of the blind rivet sleeve and comprises an external fastening geometry; and
   the blind rivet sleeve being axially and rotationally fixed to the stud,
   wherein the receiving section and the attachment section each have an exposed and external thread.

* * * * *